United States Patent [19]

Bothe et al.

[11] Patent Number: 5,096,630

[45] Date of Patent: Mar. 17, 1992

[54] PROCESS FOR THE PRODUCTION OF A METALLIZABLE MULTIPLY FILM

[75] Inventors: Lothar Bothe, Mainz-Gonsenheim; Gunter Schloegl, Kelkheim; Guenther Crass; Thomas Wilhelm, both of Taunusstein, all of Fed. Rep. of Germany

[73] Assignee: Hoechst Aktiengesellschaft, Frankfurt am Main, Fed. Rep. of Germany

[21] Appl. No.: 574,056

[22] Filed: Aug. 29, 1990

Related U.S. Application Data

[62] Division of Ser. No. 168,441, Mar. 15, 1988, Pat. No. 4,975,315.

[30] Foreign Application Priority Data

Mar. 20, 1987 [DE] Fed. Rep. of Germany ....... 3709252

[51] Int. Cl.$^5$ .................... B29C 47/06; B29C 59/14
[52] U.S. Cl. ..................................... 264/22; 204/165; 264/171; 264/177.17; 264/210.6; 264/210.7; 264/290.2; 427/34; 427/251
[58] Field of Search .............. 264/22, 171, 176.1, 264/177.17, 210.6, 210.7, 288.4, 290.2, 291; 427/39, 40, 34, 251; 204/164, 165; 428/349, 461, 910, 520

[56] References Cited

U.S. PATENT DOCUMENTS

| | | | |
|---|---|---|---|
| 4,170,304 | 10/1979 | Huke | 264/171 |
| 4,211,811 | 7/1980 | Bordini et al. | 428/461 |
| 4,303,708 | 12/1981 | Gebhardt | 428/349 |
| 4,345,005 | 8/1982 | All et al. | 428/910 |
| 4,604,322 | 8/1986 | Reid | 428/461 |
| 4,666,772 | 5/1987 | Schinkel et al. | 428/910 |
| 4,777,081 | 10/1988 | Crass et al. | 264/176.1 |
| 4,888,237 | 12/1989 | Balloni et al. | 428/349 |
| 4,929,319 | 5/1990 | Dinter et al. | 264/22 |

Primary Examiner—Jeffery Thurlow
Assistant Examiner—Mathieu Vargot
Attorney, Agent, or Firm—Foley & Lardner

[57] ABSTRACT

A process for producing a metallizable, sealable, biaxially stretch-oriented multi-ply film includes the steps of: providing melts of a predominantly polypropylene base layer, and first and second polyolefinic facing layers; co-extruding the melts through a flat film die, wherein the first and second polyolefinic facing layers are co-extruded on either side of the base layer; solidifying the co-extruded film by cooling; longitudinally stretching the co-extruded film at a temperature from about 120° to 130° C. in a ratio of from about 5 to 7:1; transversely stretching the co-extruded film at a temperature from about 160° to 170° C. in a ratio of from about 8 to 10:1; and corona-treating one facing layer of the co-extruded film which is metallizable. Each of the melts contains a calcium carbonate neutralizing agent having an absolute particle size of less than about 10 μm, a mean particle size of less than about 0.1 μm, a specific surface area of more than about 40 m$^2$/g and a whiteness of more than about 90%, and also a phenolic stabilizer against thermal degradation which has a molecular weight of more than about 1,000 g/mol, and wherein one polyolefinic facing layer contains an anti-blocking agent.

11 Claims, No Drawings

PROCESS FOR THE PRODUCTION OF A METALLIZABLE MULTIPLY FILM

This application is a division of application Ser. No. 168,441, filed Mar. 15, 1988, now U.S. Pat. No. 4,975,315.

BACKGROUND OF THE INVENTION

The present invention relates to a metallizable, sealable, biaxially stretch-oriented multi-ply film comprising a base layer essentially of polypropylene, a first polyolefinic facing layer and a second polyolefinic facing layer, all the layers containing a neutralizing agent and a stabilizer against thermal degradation.

Composite films or laminates which can be metallized are already known from the state of the art. Thus, for example, EP-A 122,495 discloses a film laminate having a surface roughness Ra from 0.2 to 1.5 $\mu$m and comprising an oriented polypropylene film and a layer laminated thereto, which is composed of an ethylene/propylene copolymer, this layer containing 10 to 50% by weight of the ethylene component. A metal layer can be laminated to both layers. The laminate is said to show excellent adhesive strength on metal layers, at least in comparison with paper layers, and to exhibit good gloss and transparency. Either of the two layers can generally contain conventional additives, such as heat stabilizers, antioxidants, antistatic agents, fillers and brighteners.

Moreover, EP-A 21,672 describes a laminate which is produced by co-extrusion and comprises an inner layer of a propylene homopolymer and at least one outer layer of an ethylene/propylene copolymer which does not contain any added lubricants. The laminate is corona-treated in order to improve the adhesion of a metal layer applied to the outer layer(s). If an outer layer is not metallized, it is sealable. Due to the absence of lubricants from at least one of the outer, non-metallized layers, however, the laminate may not easily run in the machine and, owing to the composition of the outer layers, will also not show a uniform corona treatment-effect promoting adhesion of the metal layer.

As shown by the discussion of the state of the art, none of the documents has hitherto been directed to an optimization with respect to the sealing properties, the metal adhesion or even the metal gloss of the metal layer applied to the particular laminate.

SUMMARY OF THE INVENTION

Accordingly, it is an object of the present invention to provide an improved metallizable polypropylene film.

It is a particular object of the invention to provide a metallizable polypropylene film which has been optimized with regard to the combination of the following features:
 a) good processing properties on winding up, cutting, metallizing, imprinting or extrusion-coating or laminating, and ease of running in packaging machines,
 b) very good and constant metal adhesion,
 c) a visually pleasing appearance pattern of the film, especially a high gloss of the metal layer or of the metallized surface, and
 d) good sealing properties.

It is also an object of the invention to provide a process for producing the multi-ply film according to the invention.

Still another object of the invention resides in the provision of an improved packaging film for packaging articles.

In accomplishing the foregoing objects, there has been provided in accordance with one aspect of the invention a metallizable, sealable, biaxially stretch-oriented multi-ply film, comprising a base layer comprised predominantly of propylene; a first polyolefinic facing layer on a first side of the base layer; a second polyolefinic facing layer on a second side of the base layer; each of the layers containing a neutralizing agent, comprising a calcium carbonate having an absolute particle size of less than about 10 $\mu$m, a mean particle size of less than about 0.1 $\mu$m, a specific surface area of more than about 40 m$^2$/g and a whiteness of more than about 90%, and a stabilizer against thermal degradation comprising a phenolic stabilizer having a molecular weight of more than about 1,000 g/mol; and wherein one polyolefinic facing layer contains an anti-blocking agent. Preferably, the film also includes a metal layer applied to one side of the film.

In accordance with another aspect of the invention, there has been provided a process for producing a film as defined above, which comprises the steps of co-extruding melts of the individual layers through a flat film die; solidifying the co-extruded film by cooling; longitudinally stretching at a temperature from about 120° to 130° C. in a ratio of from about 5 to 7:1; transversely stretching at a temperature from about 160° to 170° C. in a ratio of from about 8 to 10:1; and corona-treating one facing layer which is metallizable.

In accordance with still another aspect of the invention, there has been provided an improved packaging film, comprised of a metallized film according to the invention, and an improved use of the packaging film for packaging products, such as food products.

Further objects, features and advantages of the present invention will become apparent from the detailed description of preferred embodiments that follows.

DETAILED DESCRIPTION OF THE PREFERRED EMBODIMENTS

The invention provides a film of the generic type described above, wherein all the layers contain, as the neutralizing agent, a calcium carbonate having an absolute particle size of less than about 10 $\mu$m, a mean particle size of less than about 0.1 $\mu$m, a specific surface area of more than about 40 m$^2$/g and a whiteness of more than about 90%. As the stabilizer, the films contain a phenolic stabilizer having a molecular weight of more than about 1,000 g/mol, and one polyolefinic facing layer contains an anti-blocking agent.

The preferred polypropylene used for the base layer within the scope of the present invention is an isotactic propylene homopolymer or a copolymer which is composed of propylene units as the predominant component. Such polymers usually have a melting point of more than about 150° C. Isotactic polypropylene having an n-heptane-soluble fraction of less than about 15% by weight, copolymers of ethylene and propylene having an ethylene content of less than about 2% by weight and copolymers of propylene with other alphaolefins having 4 to 8 carbon atoms and containing less than about 6% by weight of these alpha-olefins are typical examples of the preferred thermoplastic polypropylene of the base layer.

The preferred thermoplastic polymers advantageously have a melt index in the range from about 0.5 g/10 minutes to 8 g/10 minutes at 230° C. and 2.16 kg load (DIN 53 735), in particular from about 1.5 g/10 minutes to 4 g/10 minutes.

The facing layer of the surface-treated side which is to be metallized is essentially composed of an isotactic polypropylene having an n-heptane-soluble fraction of about 15% by weight or less or of a propylene/ethylene copolymer having an ethylene content of about 3% by weight or less or of a propylene/ethylene and/or butene-1 copolymer having an ethylene and butene content of about 5% by weight or less in total. The melting point of the polymer for the facing layer is above about 145° C.

Isotactic polypropylene is particularly preferred. The propylene polymer of this facing layer has in general a melt index from about 0.5 g/10 minutes to 10 g/10 minutes, preferably from about 1.5 g/10 minutes to 4 g/10 minutes, at 230° C. and 2.16 kg load (DIN 53 735).

For a further improvement of the properties, this facing layer contains a saturated hydrocarbon resin having a softening temperature from about 100° to 160° C., in particular from about 120° to 140° C.

Among the numerous low-molecular resins, hydrogenated hydrocarbon resins are preferred, especially in the form of petroleum resins, styrene resins, cyclopentadiene resins and terpene resins (these resins are described in Ullmanns Enzyklopaedie der Techn. Chemie [Ullmann's Encyclopedia of Industrial Chemistry], 4th edition, Volume 2, pages 539 to 553). Hydrogenated cyclopentadiene resins have proved to be particularly suitable hydrocarbon resins. The effective quantity of saturated resin is from about 2 to 12% by weight, preferably from about 6 to 10% by weight, relative to the total weight of this facing layer.

The facing layer is subjected to a surface treatment by electric corona discharge. In the corona treatment, the film surface not intended for the surface treatment is passed over a grounded roll, above which a flame corona emanating from metallic electrical electrodes is struck. The corona discharge is usually carried out at about 10,000 V using alternating current of about 10,000 Hz. On passing through the discharge zone, the free film surface is polarized by the high-energy chemical processes taking place there and thus becomes receptive for polar media to a certain extent.

The sealable olefinic facing layer is essentially composed of a propylene copolymer. Propylene/ethylene copolymers preferably containing from about 2 to 10% by weight of ethylene, propylene/butylene copolymers preferably containing from about 0.5 to 20% by weight of butylene, ethylene/propylene/butylene terpolymers preferably containing from about 0.5 to 7% by weight of ethylene and from about 5 to 30% by weight of butylene or mixtures of these polymers are preferred (percentages by weight relative to the total weight of the copolymer or terpolymer). The melting point of the polymer for the sealing layers is in general from about 80° to 160° C., preferably from about 100° to 140° C. The melt index of this polymer is higher than that of the base layer polymer and is in general from about 1 to 12 g/10 minutes, preferably from about 3 to 9 g/10 minutes, at 230° C. and 2.16 kg load (DIN 53 735).

The sealable olefinic facing layer contains conventional anti-blocking agents in a quantity from about 0.1 to 0.7% by weight, in particular from about 0.2 to 0.5% by weight, relative to the weight of the facing layer. Incompatible organic polymers such as polyamide, polyester, polycarbonates and the like or inorganic substances such as silica (e.g. SYLOID 244) and/or silicates, in particular aluminum silicate (e.g. ASP 900), can also be added.

All the layers, i.e. the base layer and the two facing layers, contain, as the stabilizer, a phenolic stabilizer in a quantity from about 0.05 to 0.15% by weight, preferably about 0.1% by weight, relative to the particular layer. Particularly preferably, the stabilizer content is the same in all the layers. The stabilizer should have a molecular weight of more than about 1,000 g/mole. Pentaerythritol tetrakis-3-(3,5-di-tert.-butyl-4-hydroxyphenyl)-propionate (IRGANOX 1010) is particularly preferred. The phenolic stabilizer can be combined with tris-(2,4-di-tert.-butylphenyl) phosphite.

According to the invention, all the layers likewise contain a specific calcium carbonate as the neutralizing agent. Although calcium carbonate is frequently mentioned in general, if it is intended to eliminate adverse effects of catalyst residues on the film and film processing, for example, corrosion in the processing machines, greater importance is in general attached in this connection to additives such as calcium stearate or tripotassium citrate.

Surprisingly, it has now been found that a small quantity of the specific calcium carbonate, incorporated into all the layers of the multi-ply film according to the invention, leads to a reduction of corrosion in the processing machines and, in comparison with all additives hitherto known, does not cause any deposits and exudations, which would require production interruptions for cleaning work on the production machines. A risk to the quality of the films due to dripping wax drops is effectively avoided, since no exudations or deposits appear in the transverse stretching frame. Likewise, if the films are processed together with regenerated film arising in film production, their color quality remains unchanged; there is no discoloration of the film if regenerate is used.

Each of the layers contains from about 0.01 to 0.2% by weight, preferably from about 0.03 to 0.1% by weight, relative to the particular layer, of this specific calcium carbonate, of which identical proportions are preferably present in all the layers and the particle size of which should be as small as possible. In absolute terms, the particles are smaller than about 10 $\mu$m, preferably smaller than about 7 $\mu$m, i.e. there should not be any particles having greater diameters, and the mean particle diameter should be less than about 0.1 $\mu$m, preferably less than about 0.05 $\mu$m. The specific surface area of the calcium carbonate should be more than about 40 m$^2$/g, preferably more than about 80 m$^2$/g. The whiteness is more than about 90%, in particular more than about 95%.

The thickness of the multi-ply film according to the invention can vary within wide limits. The thickness (total thickness) of the multi-ply film is in general from about 10 to 40 $\mu$m, preferably from about 20 to 30 $\mu$m. The facing layers are about 0.2 to 3 $\mu$m thick, preferably from about 0.4 to 1.5 $\mu$m and in the particularly preferred embodiment of the invention they have the same thickness.

Via the sealable facing layer, it is possible to expand the multi-ply film according to the invention by bonding it to itself to give a six-ply film laminate which, if desired, can carry a metallization on both outer layers. Likewise, it is also possible to bond single-ply, two-ply or more than three-ply laminates, in particular of polypropylene, via this facing layer to the multi-ply film according to the invention.

As a result of the special design, according to the invention, of the surface-treated facing layer, in particular the use of the specific calcium carbonate and also the hydrogenated hydrocarbon resin, several very important factors, which affect the film properties, are improved to a surprising extent.

The surface shows improved scratch resistance as compared with facing layers modified by calcium stearate. Likewise, the surface according to the invention shows especially an outstanding surface gloss which is particularly effective whenever the surface is laminated with the metal layer or metallized. Precisely the gloss of the surface of the metal layer shows very clearly whether the underlying film layer is sufficiently plane and smooth.

The metal layer can be composed of any suitable metal. Layers of aluminum, zinc, gold or silver or of appropriate alloys are preferred, with aluminum or aluminum-containing alloys being particularly preferred. Electroplating, sputtering and vacuum vapor-deposition may be mentioned as suitable metallizing processes, with vacuum vapor-deposition being preferred.

The thickness of the metal layer is about 20 to 600 nm, preferably about 25 to 100 nm.

If calcium stearate is used as the neutralizing agent, the adhesion effect caused by the corona treatment diminishes more and more with time due to migration of the reaction products of the neutralization reaction. For this reason, the metal adhesion does not remain constant. Surprisingly, when the multi-ply film of the composition according to the invention is used, a substantially more favorable corona decay behavior is observed, i.e., the metal adhesion over a prolonged period is, as a consequence thereof, substantially better than in the case of conventional metallized laminates.

Metallized films are increasingly used for packaging purposes, especially for foodstuffs In particular, the oxygen permeability and the water-vapor permeability are reduced by the metal layer applied to the plastic film, whereas the stiffness and ease of running in machines are generally increased, and the light-proofness reaches a maximum value. In the journal "Neue Verpackung", No. 9, page 1048, 1st and 3rd column, 1983, it is pointed out that the good barrier properties of metallized plastic films are persistent only if, on the one hand, the applied metallization has excellent adhesion but, on the other hand, care is taken to avoid damage to the metal layer, especially by stretching, bending, scratching or creasing. The metallizable multi-ply film according to the invention is therefore also suitable for this purpose, because of the excellent adhesion properties of the high-gloss metallizable facing layer which is planar to a particularly high degree.

The metal layer of the multi-ply film according to the invention can be protected from mechanical damage by lamination with a polyethylene film. Thin polyethylene layers can also be applied by extrusion-coating. The metallizable film according to the invention can be used in an outstanding way for the production of composites with other films (oPP, PET and the like) or paper.

The metallizable multi-ply film according to the invention is preferably produced by co-extrusion. In this case, the melts of the individual layers of the multi-ply film according to the invention are co-extruded through a flat film die, solidified by cooling and then longitudinally stretched at a temperature from about 120° to 130° C. in a ratio of about 5 to 7:1 and transversely stretched at a temperature from about 160° to 170° C. in a ratio of about 8 to 10:1. Simultaneous stretching is also possible. Finally, the biaxially stretched film is thermofixed, and the metallizable facing layer is corona-treated. The thermofixing is carried out at a temperature of preferably about 150° to 160° C. for a duration of about 0.5 to 10 seconds.

The incorporation of the anti-blocking agents, the stabilizers, the hydrogenated hydrocarbon resin and the specific calcium carbonate is carried out in the known manner by means of a mixer, extruder, roll and kneader; however, a masterbatch can also be used, in particular for the specific calcium carbonate.

The invention will be explained in more detail by reference to the merely illustrative examples which follow, without being restricted thereto.

The multi-ply films illustrated in the examples and comparison examples have an overall thickness of 25 $\mu$m in each case, the facing layers each having a thickness of 0.6 $\mu$m.

The three-ply films were all produced by co-extrusion. This was followed by two-stage stretching with a longitudinal stretching factor of 6 and a transverse stretching factor of 9.

The metallizable facing layer was corona-treated.

EXAMPLE 1

The base layer and the metallizable facing layer were composed essentially of an isotactic propylene homopolymer having a melting point of 165° C. The sealable facing layer was composed essentially of a propylene-/ethylene copolymer containing 4.5% by weight of ethylene, relative to the copolymer. All the layers contained 0.05% by weight, relative to the particular layer, of a precipitated calcium carbonate having a maximum particle size of 6 $\mu$m, a mean particle diameter of 0.02 $\mu$m, a specific surface area of 105 m$^2$/g and a whiteness of 96%. Likewise, all the layers contained 0.1% by weight, relative to the particular layer, of the IRGANOX 1010 stabilizer. In addition, the metallizable facing layer also contained 6% by weight, relative to this facing layer, of a fully hydrogenated cyclopentadiene resin having a softening point of 120° C., whereas the sealable facing layer contained 0.2% by weight, relative to this facing layer, of the SYLOID 244 anti-blocking agent.

EXAMPLE 2

The composition of the base layer corresponded to that in Example 1. The metallizable facing layer differed from the corresponding facing layer in Example 1 only by the polymer: instead of the isotactic propylene homopolymer, a propylene/ethylene copolymer containing 2.5% by weight of ethylene, relative to the copolymer, and having a melting point of 150° C. was used. Instead of a propylene/ethylene copolymer, the sealable facing layer was essentially composed of an ethylene/propylene/butylene terpolymer containing 1.4% by weight of ethylene, 92.2% by weight of propylene and 6.4% by weight of butylene, relative to the terpolymer Instead of the SYLOID 244 anti-blocking agent from Example 1, 0.3% by weight of ASP 900, relative to this facing layer, was used.

The content and type of calcium carbonate and of the stabilizer were the same as in Example 1.

COMPARISON EXAMPLE 1

The multi-ply film of this comparison example had an ABA structure. Both facing layers were composed essentially of a propylene/ethylene copolymer containing 4.5% by weight of ethylene, relative to the copolymer. Both layers contained 0.2% by weight of SYLOID 244 as an anti-blocking agent and 0.1% by weight of IRGANOX as the stabilizer, each relative to the facing layer. Apart from the calcium carbonate, the base layer was composed in accordance with Examples 1 and 2. In place of the 0.05% by weight of calcium carbonate used in the examples, all three layers each contained 0.05% by weight of calcium stearate as the neutralizing agent.

COMPARISON EXAMPLE 2

The example corresponded to Comparison Example 1, but with the difference that the base layer also contained 0.2% by weight of stearic amide, relative to the base layer, in addition to the 0.05% by weight of calcium stearate.

The results are summarized in the Table which follows.

TABLE

| | Interfering deposits in the transverse stretching frame | Scratch resistance | Gloss | Metal adhesion |
|---|---|---|---|---|
| Example 1 | none | + + | 130 | + + |
| Example 2 | none | + + | 120 | + + |
| Comparison Example 1 | yes[x)] | - - | 90 | + - |
| Comparison Example 2 | yes[x)] | - - | 90 | - - |

+ + = good
+ - = moderate
- - = poor

[x)]In all the comparison examples, interfering deposits of stearic acid occur in the transverse stretching frame, which soil the frame or drip onto the film web and, as an interfering wax drop, impair the quality of the film.

The gloss was determined in accordance with DIN 67 530, using an RB reflectometer from Dr. Lange (Federal Republic of Germany). The gloss is termed good if it is above 110.

The scratch resistance of a film is understood as the resistance of a film surface to changes due to mechanical stress, in particular a frictional stress. As a rule, the rise in tubidity $\Delta T$, caused by the scratching, is used as a measure of the scratch resistance of a film.

$$\Delta T = T_v - T_0$$

Tv is here to be understood as the turbidity of the scratched film, and To is to be understood as the turbidity of the unchanged original film, the turbidity of one film ply being determined in each case during the scratch resistance measurement.

The scratch resistance against frictional stress was determined in accordance with DIN 53 754. The measurements were carried out using an abrasion measuring apparatus of 1161 type from Frank (Federal Republic of Germany), friction wheels of the CALIBRASE CS-10F brand from Teledyne (U.S.A.) being used and loaded with 250 g.

The scratch resistance is termed good if the rise in turbidity is less than 20%.

The metal adhesion is assessed by means of an adhesive tape test. An adhesive tape is stuck to the metal layer and slowly peeled off. The metal adhesion is termed good if 0% of metal is peeled off. The metal adhesion is termed moderate if less than 10% is peeled off. In the case of more than 10% of metal being peeled off, the metal adhesion is termed poor.

What is claimed is:

1. A process for producing a metallizable, sealable, biaxially stretch-oriented multi-ply film which comprises the steps of
    (a) providing melts of
        i) a base layer comprised predominantly of polypropylene,
        ii) a first polyolefinic facing layer and
        iii) a second polyolefinic facing layer;
    employing in each of said melts a neutralizing agent comprising a calcium carbonate having an absolute particle size of less than about 10 μm, a mean particle size of less than about 0.1 μm, a specific surface area of more than about 40 m$^2$/g and a whiteness of more than about 90%, and a stabilizer against thermal degradation comprising a phenolic stabilizer having a molecular weight of more than about 1,000 g/mol, wherein one polyolefinic facing layer contains an anti-blocking agent, and wherein one polyolefinic facing layer is metallizable,
    (b) co-extruding said melts through a flat film die, wherein said first polyolefinic facing layer is co-extruded on a first side of said base layer and said second polyolefinic facing layer is co-extruded on a second side of said base layer;
    (c) solidifying said co-extruded film by cooling;
    (d) longitudinally stretching said co-extruded film at a temperature from about 120° to 130° C. in a ratio of from about 5 to 7:1;
    (e) transversely stretching said co-extruded film at a temperature from about 160° to 170° C. in a ratio of from about 8 to 10:1; and
    (f) corona-treating said metallizable facing layer of said co-extruded film,
    (g) whereby the neutralizing agent reduces corrosion of processing equipment during stretching.

2. A process as claimed in claim 1, wherein said corona treatment is carried out using an alternating current of about 10,000 V and 10,000 Hz.

3. A process as claimed in claim 1, wherein the polyolefinic facing layer formed from one of said melts provided in steps (a)(ii) and (a)(iii) is non-heat-sealable.

4. A process as claimed in claim 3, wherein said polyolefinic facing layer formed from said melt provided in step (a)(ii) or (a)(iii) further comprises a saturated hydrocarbon resin.

5. A process as claimed in claim 4, wherein said saturated hydrocarbon resin comprises a hydrogenated cyclopentadiene resin which is present in a quantity from about 2% to 12% by weight, relative to the weight of the facing layer.

6. A process as claimed in claim 5, wherein said anti-blocking agent, said stabilizer, said saturated hydrocarbon resin and said calcium carbonate are incorporated in said melt by means of a masterbatch.

7. A process as claimed in claim 1 including depositing a metal layer on at least one surface of said film by electroplating, sputtering or vacuum deposition.

8. A process as claimed in claim 7, wherein said metal layer is comprised a metal selected from the group consisting of aluminum, zinc, gold, silver and alloys thereof.

9. A process as claimed in claim 8, wherein said metal is aluminum or an aluminum alloy.

10. A process as claimed in claim 7, wherein said metal layer has a thickness from about 20 to 600 nm.

11. A process as claimed in claim 10, wherein said thickness is about 25 to 100 nm.

* * * * *